US005966365A

United States Patent [19]
Schumacher

[11] Patent Number: 5,966,365
[45] Date of Patent: Oct. 12, 1999

[54] APPARATUS FOR STORING DATA CARRIERS WITH AUTOMATIC ACCESS TO THE INDIVIDUAL DATA CARRIERS

[76] Inventor: Alain Schumacher, 6, Rue de la Forêt Verte, Heisdorf L-7340, Luxembourg

[21] Appl. No.: 08/875,051
[22] PCT Filed: Jan. 3, 1996
[86] PCT No.: PCT/EP96/00129
 § 371 Date: Jun. 23, 1997
 § 102(e) Date: Jun. 23, 1997
[87] PCT Pub. No.: WO96/22599
 PCT Pub. Date: Jul. 25, 1996

[30] Foreign Application Priority Data

Jan. 16, 1995 [LU] Luxembourg ............ 95100479

[51] Int. Cl.⁶ ............... G11B 17/26; G11B 17/22
[52] U.S. Cl. ....................... 369/178; 369/37
[58] Field of Search ............... 369/36, 37, 178, 369/192; 360/92

[56] References Cited

U.S. PATENT DOCUMENTS

5,251,082 10/1993 Elliot et al. .................. 360/97.01
5,541,897 7/1996 Baca et al. ........................ 369/36
5,640,288 6/1997 Horie ................................. 369/36

*Primary Examiner*—George J. Letscher
*Attorney, Agent, or Firm*—Schmeiser, Olsen & Watts

[57] ABSTRACT

One or more storing apparatuses (90) are provided, in which a number of carrier platters (22), stacked one above the other, are individually rotatable around a central column (26). Each carrier platter (22) has a number of depository zones for data carriers and an opening (28), these openings forming in the waiting positions of the individual carrier platters (22) an open continuous shaft (30), through which the individual data carriers are randomly accessible and can be transported by means of a common gripping and transferring apparatus (92) into a writing and reading station (106).

14 Claims, 8 Drawing Sheets

APPARATUS FOR STORING DATA CARRIERS WITH AUTOMATIC ACCESS TO THE INDIVIDUAL DATA CARRIERS

The present invention relates to an apparatus for storing data carriers with automatic access to the individual data carriers, having at least one storing apparatus for keeping the data carriers, a reading-writing station for the data carriers and a gripping and transferring apparatus to transfer each data carrier individually between the storing apparatus and the reading-writing station or vice versa.

The invention is concerned in particular with the keeping of optical storage discs, for example so-called compact discs (CDs). After having been introduced in the audio sector a few years ago, these discs have in the meantime become the most popular data carriers in the electronic data processing sector because of their high data capacity.

For use in single-station installations, there are reading devices which in principal can be operated similarly to floppy disc drives. The desired compact disc is in this case fetched from a depository and pushed manually into the reading device. At the end of the reading operation, the disc is removed manually again from the reading device and deposited again in accordance with an expedient plan.

However, in work which requires frequent access to various compact discs, such as for example data bases with a plurality of compact discs or various complementary data bases, the required manipulations of the compact discs may quickly become time-consuming and tiresome extra things to do. To simplify the manipulations in the case of multiple access to various discs, there are therefore already reading devices which can be fitted with a cartridge holding, for example, six discs, or the installations are equipped with a plurality of reading devices.

In view of the success of the compact disc in the case of single-station installations, there should actually be an even greater success to be found in the case of organizations operating in an information network, such as administrative authorities, universities, libraries, data bases etc., because, apart from the wide variety of applications of so-called "electronic publishing", compact discs are used within a relatively large organization for the ideal storage of internal organizational data. Furthermore, due to the digitalization of telephone systems, or the forthcoming interlinking of computer and telephone systems, there are opening up additional applications as a voice tank for long-term speech archiving.

However, up till now this breakthrough for compact discs has failed, at least partly, in the case of networked installations because the manipulation problems already mentioned above as occurring in the case of single installations are even more in evidence here. To allow working with compact discs, it is admittedly possible in the case of networked computer installations to equip each PC with its own reading device, but with an increasing number of PCs this requires considerable expenditure in terms of financial and organizational means. At operations working with central computer systems and where workplaces are thus equipped only with terminals, only the central installation of a number of reading devices comes into consideration. The manual fitting and removing of compact discs is, however, difficult to implement in this case for organizational and technical reasons, particularly in the case where computer and workplace are geographically separate.

In the case of decentrally administered compact discs, there is also a problem when a disc is needed which is not in the area readily accessible from the workplace.

To procure a compact disc with information which a relatively large group of users may use occasionally appears to be nonsensical if the person potentially interested in certain information first of all has to spend a great deal of time making inquiries throughout the operation as to the whereabouts of the disc. If computer and workplace are geographically separate, there is then additionally the need for transportation by courier or mail. In the case of in-house archiving discs, furthermore, it is not recommendable from a security point of view for them to be lent out decentrally.

Although for some time there has already been on the market devices which can archive relatively large quantities of data on the principle of random access to optical storage discs, these devices have various disadvantages which restrict their use for solving the disadvantages mentioned above. In the case of some of the devices, system-specific data carriers (for example discs of a relatively large diameter) are used, which makes integration with standard "electronic publishing" compact discs impossible. In the case of other devices, there is only a limited number of reading-writing stations, which although adequate when used as a pure archiving system prevent use as a central information system. Most devices require a relatively long period of time for changing the discs and are intended only for a limited number of discs to be deposited, so that the limit to the capacity of the system is quickly reached.

The object of the present invention is to provide an apparatus of the generic type mentioned at the beginning which offers automatic and random access to relatively large volumes of data carriers in a networked operation and which, as a server, can serve a large number of customers simultaneously and without unnecessary waiting times, centrally and in a reliable way.

According to the invention, this object is achieved by each storing apparatus comprising a number of carrier platters stacked one above the other and rotatably mounted, which are supported by a central vertical column and are rotatable individually around the column between a waiting position and access positions by means of a driving apparatus, by each carrier platter having a number of depository zones for the data carriers and at least one opening, which are arranged on a concentric circular line, the respective openings of the individual carrier platters being arranged such that they form in the waiting position of all the carrier platters a cylindrical shaft extending over the entire height of the storing apparatus, through which shaft the carrier platters are accessible by the gripping and transferring apparatus.

The data carriers may be commercially available compact discs.

Each carrier platter is preferably assigned a separate driving apparatus, which comprises a pseudo-linear stepping motor, each carrier platter having an outer toothed ring of magnetic soft iron, which forms the rotor of the stepping motor.

According to a preferred embodiment, each carrier platter has six circular depository zones, each depository zone comprising a plate-shaped depression with an open bottom.

The individual carrier platters are preferably arranged in groups on the central column by means of spacer rings and snap rings, each carrier platter being located between an upper ball ring and a lower ball ring.

Each storing apparatus is furthermore assigned a locking apparatus, in order to lock the platters in the waiting position and in the access positions.

The locking apparatus preferably has a number of electromagnets and horizontally pivotable levers corresponding to the number of carrier platters, which levers are respectively pivotable under the action of a spring in engagement with the outer toothed ring of a carrier platter and, upon excitation of the assigned magnet armatures, can be unlocked against the action of their spring.

The electromagnets and the pivoting levers are preferably arranged in two rows in a housing.

Each storing apparatus comprises a disc store which is arranged in a cylindrical housing with an outer wall, there being provided between the outer wall and the disc store a locking apparatus, extending along the disc store, and two drive units with the respective drives for even-numbered and odd-numbered carrier platters.

According to a preferred embodiment, the gripping and transferring apparatus comprises a rotatable vertical rail with a carriage which can be moved up and down along the rail, and a gripping arm which extends from the carriage vertically into the shaft of a disc store and on the end of which a pneumatic suction head is provided.

According to a first embodiment, the rotatable rail extends axially through the supporting column of a disc store.

According to a further exemplary embodiment with a larger capacity, a plurality of storing apparatuses are arranged around a common gripping and transferring apparatus.

The reading-writing station is preferably arranged above the storing apparatus or apparatuses and around the gripping and transferring apparatus and comprises at least a number of writing or reading devices which are stacked one above the other and can be served individually by the gripping arm.

The invention has thereby created a disc library with automatic and random access to each individual disc, which enables a large number of customers to transport a selected compact disc from its depository zone into one of the many devices of the reading-writing station within the shortest time by telematic operation.

Exemplary embodiments of the invention are represented in the drawings, in which identical parts are denoted by the same reference numerals, and are described in more detail below. In the drawing.

Figure 1:
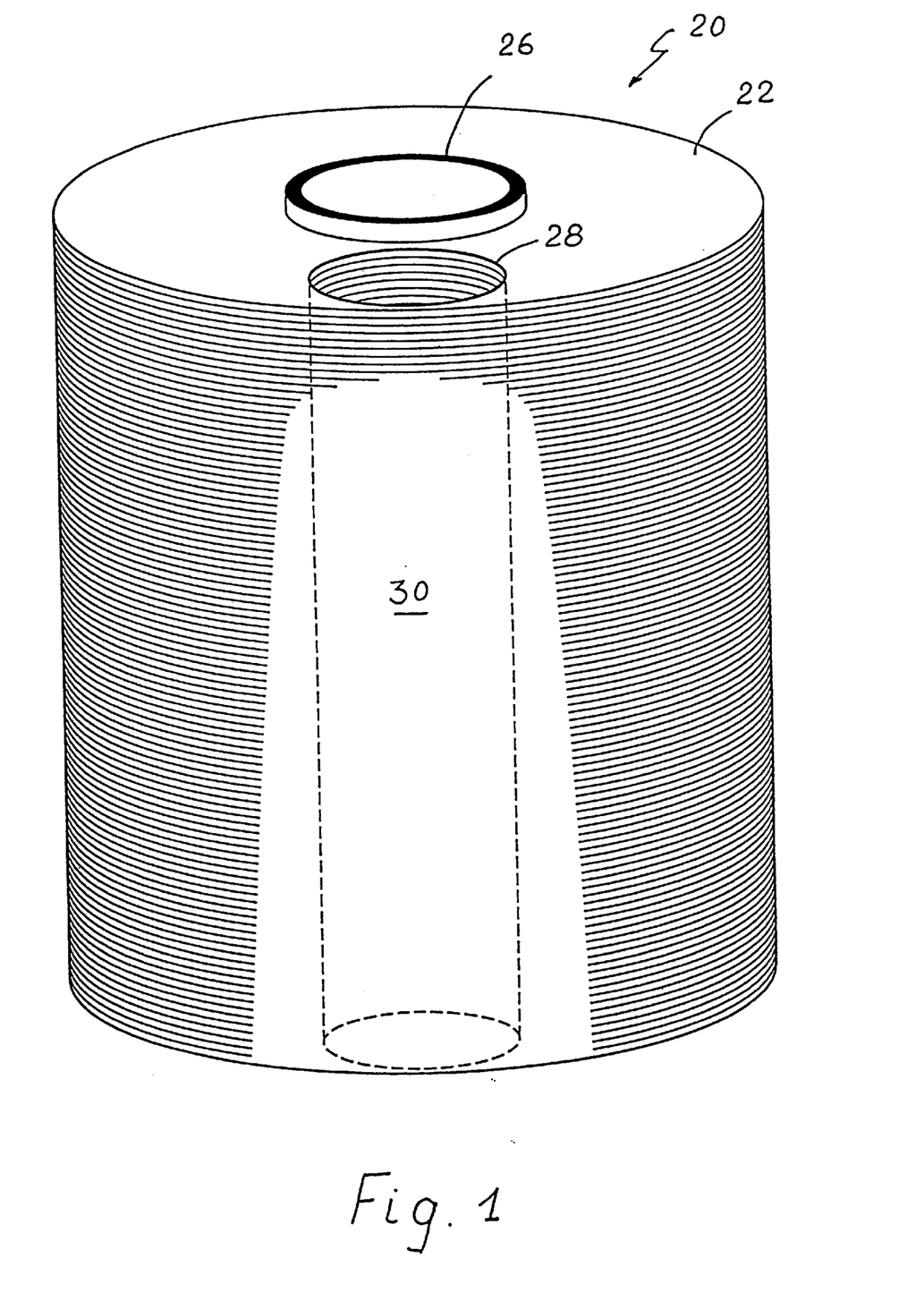
FIG. 1 shows an overall view of a disc store.

FIG. 1 shows in a perspective view the outline of a disc store 20 according to the invention. This comprises a number, in the exemplary embodiment shown one hundred, circular carrier platters 22 stacked one above the other, with a round central cut-out 24 (see also FIG. 2). The stack is supported by a central column 26, which extends axially through the cut-outs 24 of the individual platters.

Each carrier platter 22 has a circular opening 28 with a larger diameter than that of the compact discs. As described in more detail below, all the carrier platters 22 are individually rotatable around the carrier column 26, each carrier platter being assigned, however, a predetermined position of rest in the direction of rotation, to be precise in such a way that whenever all the platters 22 are in the position of rest the individual openings 28 are arranged axially in a row with one another and form a cylindrical shaft 30 extending over the height of the stack. If one platter 22 is turned out of the waiting position, its respective surface area becomes accessible by means of a gripping apparatus, described further below, through the open part of the shaft 30 lying above.

Figure 2:
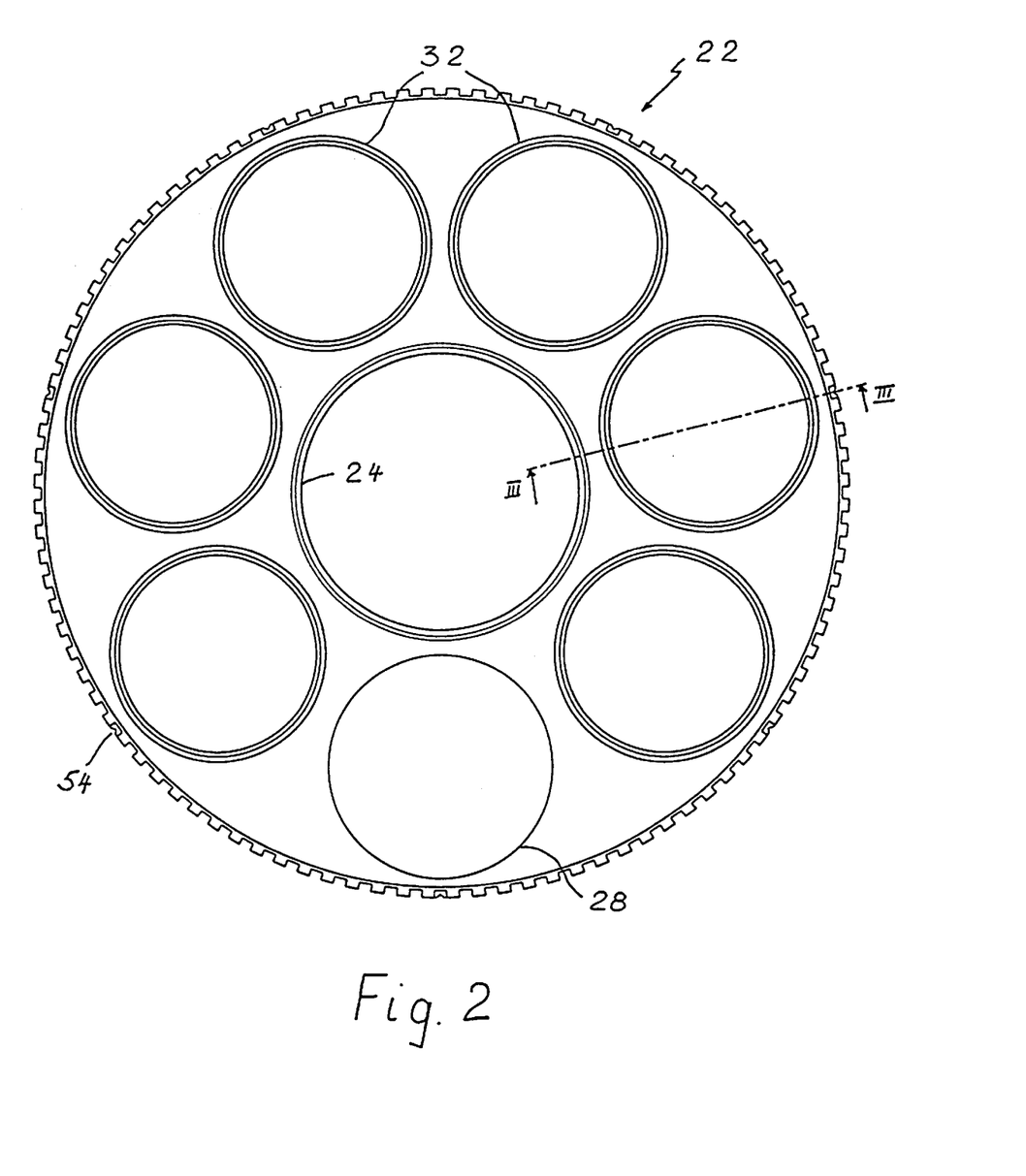
FIG. 2 shows a carrier platter in plan view.

As FIG. 2 reveals, each carrier platter 22 has, apart from the central cut-out 24 and the opening 28, also a number, in the example shown six, of circular depository zones 32 for the depositing and storing of six discs. The depository zones 32 are distributed with the opening 28 in the form of a ring around the central cutout, so that when the platters 22 are turned the individual depository zones 32 pass the shaft 30 one after the other. With appropriate turning of the individual platters 22, there is consequently random access to each individual platter 22 and to each individual depository zone 32 or each compact disc deposited thereupon.

The size of the carrier platters 22 and the number of depository zones 32 on each carrier platter 22 and also the number of carrier platters stacked one above the other can be adapted to the individual operating requirements. In the case of a hundred carrier platters 22 each with six depository zones, the storing apparatus has a capacity of 600 compact discs. With the current capacity of a compact disc, this corresponds to a database of 780 gigabytes.

It would also be quite conceivable to provide larger carrier platters with a plurality of concentric rings of depository zones and a corresponding number of openings for the formation of a plurality of access shafts. This would more than double the storage capacity.

The individual carrier platters may consist of plastic or of metal, preferably of aluminium.

Figure 3:
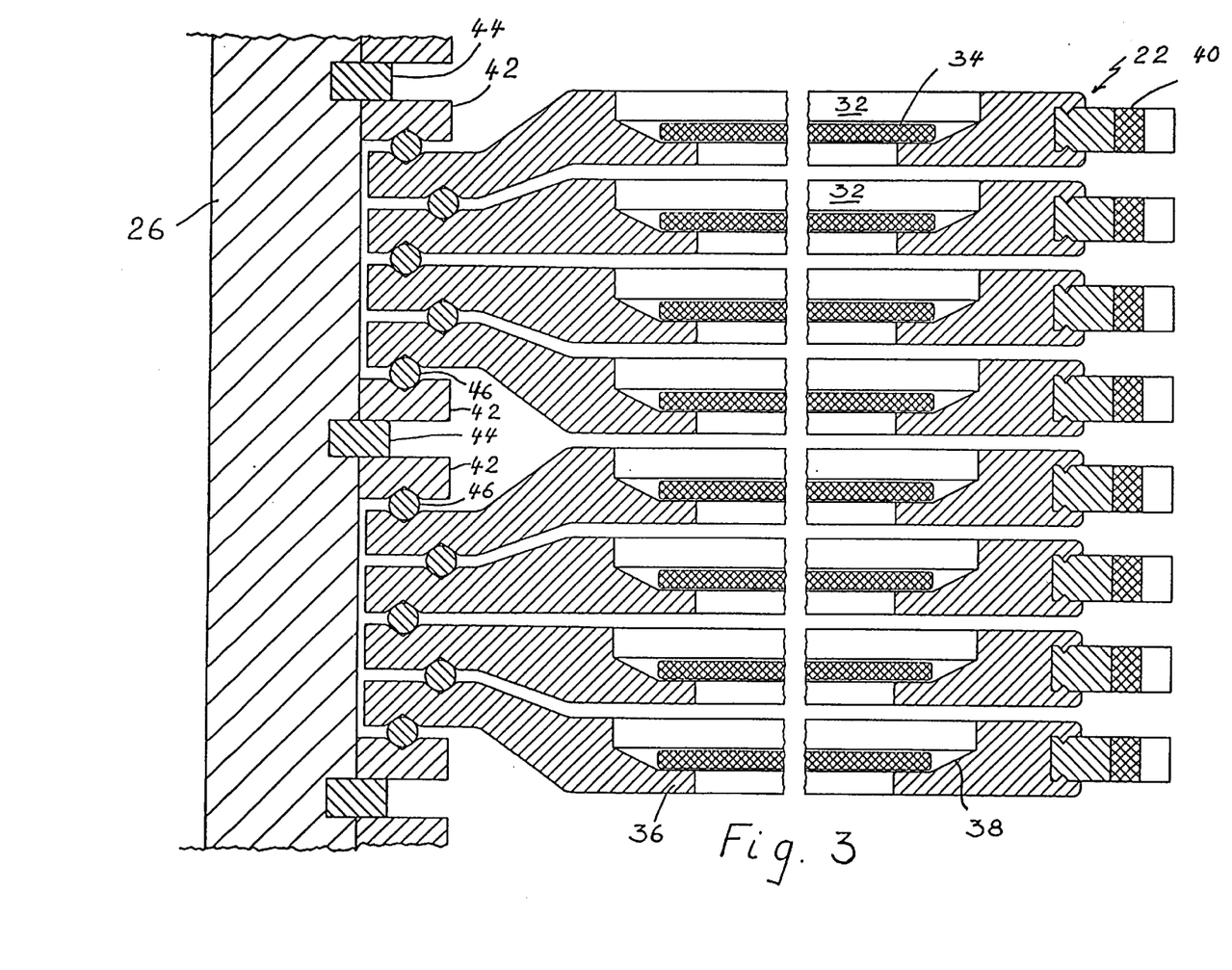
FIG. 3 shows an enlarged representation of a partial section through the disc store along the line of intersection III—III in FIG. 2.

FIG. 3 shows further details of the carrier platters 22 and their arrangement on the column 26. Each depository zone 32 comprises a plate-shaped depression for receiving the individual compact discs 34. For the purpose of weight saving, the bottom of each depository zone 32 is preferably open and has only a flat annular supporting surface 36 for the compact discs 34. The transition between the flat supporting surfaces 36 and the edge of the depository zones is preferably designed as a sloping annular ramp 38, in order that the discs 34 always slide automatically into the same position and do not move of their own accord when the platters are turned.

Each carrier platter has a toothed ring 40 of magnetic soft iron over the entire outer circumference. As explained in more detail further below, this toothed ring serves for driving and locking the carrier platters 22.

As can be seen from FIG. 3, to improve stability, the carrier platters 22 are preferably arranged in groups, for example of four platters, around the column 26. Each group is supported between two spacer rings 42, while the spacer rings 42 are respectively clamped between snap rings 44, which can be snapped into corresponding grooves on the column. Ball rings are provided between two neighbouring carrier platters 22 or between the outer carrier platters of one group and the associated spacer rings 42, the balls 46 running in corresponding ball-running channels on the carrier platters 22 and the spacer rings 42. The two ball rings on the upper side and on the underside of a carrier platter preferably have different diameters, thereby ensuring better overall stability.

In order that, in spite of the spacer rings and snap rings, there are regular distances between the carrier platters 22 and that the space can be fully utilized vertically, the carrier platters in each group are angled off upwards and downwards in pairs. With this arrangement, it is possible to stack the individual carrier platters 22 with regular distances between them of only 1 mm. With a carrier thickness of 5 mm and a stack of a hundred platters, this produces a compact storage height of only 60 cm.

Figure 4:
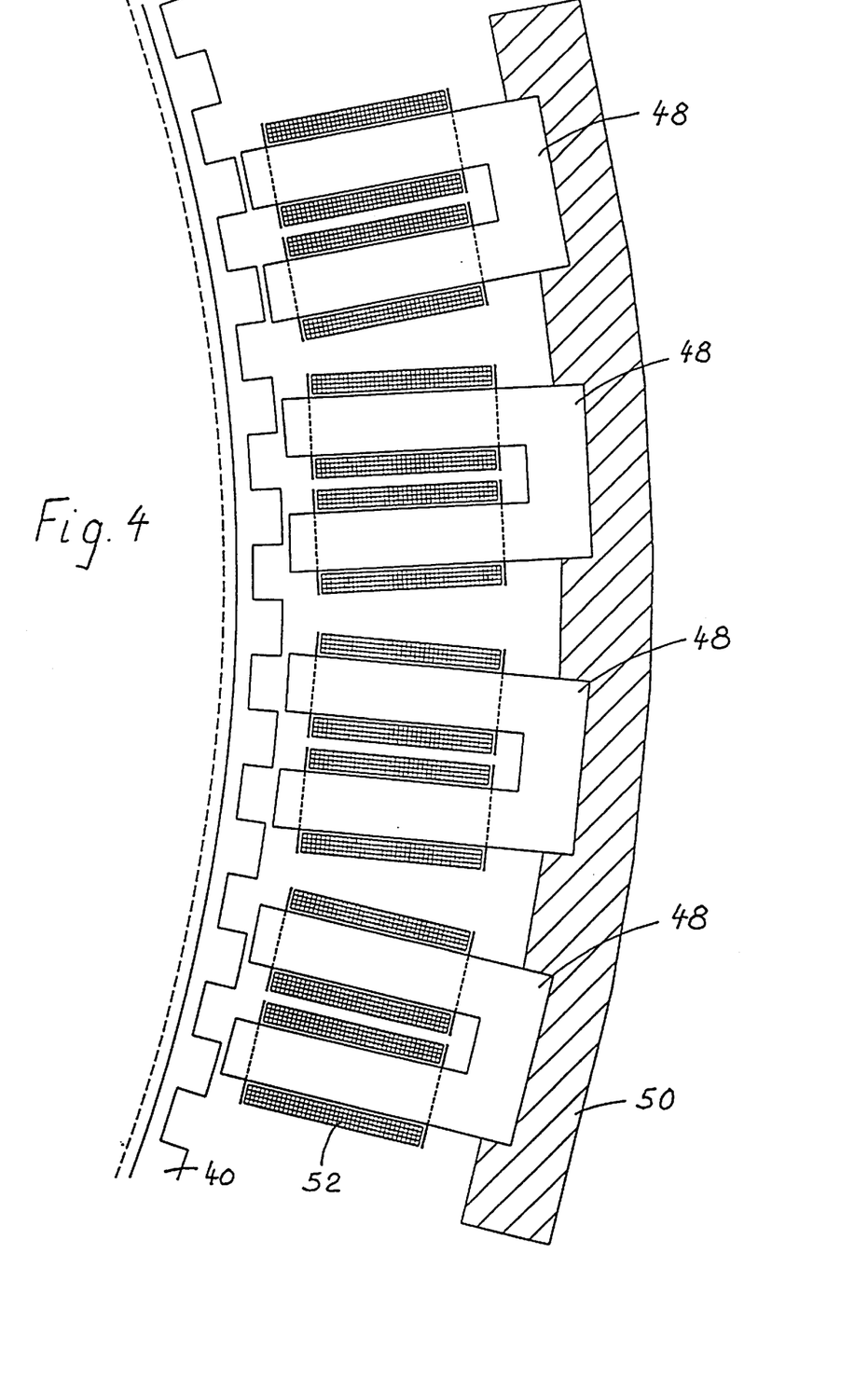
FIG. 4 shows an enlarged view of a drive of a carrier platter.

FIG. 4 shows a preferred exemplary embodiment of a driving apparatus in order to rotate the associated carrier platter around the column 26. The carrier platter is indicated in FIG. 4 by its outer toothed ring 40. The drive comprises a pseudo-linear stepping motor known per se. Opposite the toothed ring 40 there are four magnet armatures 48, which are fastened on a supporting rail 50 running along the platter stack. The two legs of each magnet armature 48 are assigned two neighbouring teeth of the toothed ring 40 of a carrier platter. Each leg of the four magnet armatures bears a winding 52, which is operated by d.c. voltage via a circuit known per se (not shown). With cyclical sequential commutating of the excitation of the windings, each tooth of the toothed ring 40 is attracted by the alternating magnetic field from one magnet leg to the other and from one magnet armature 48 to the next, whereby the toothed ring 40 is set in rotation and forms the rotor of the stepping motor. The acceleration and braking of the platters is likewise performed by the stepping motor.

Each carrier platter 22 is assigned a stepping motor according to FIG. 4. In view of the thinness of the carrier platters and their small distances apart, there are however preferably two drive units provided, one comprising the stepping motors for the even-numbered carrier platters and the other comprising those for the odd-numbered carrier platters.

For accurate positioning of each carrier platter in the waiting position or in one of the six access positions, each depository zone 32 and the opening 28 of each carrier platter are assigned a locking position. For this purpose, as FIG. 2 shows, at the respective points of the toothed ring the tooth gaps are designed as engaging grooves 54.

Figure 5:
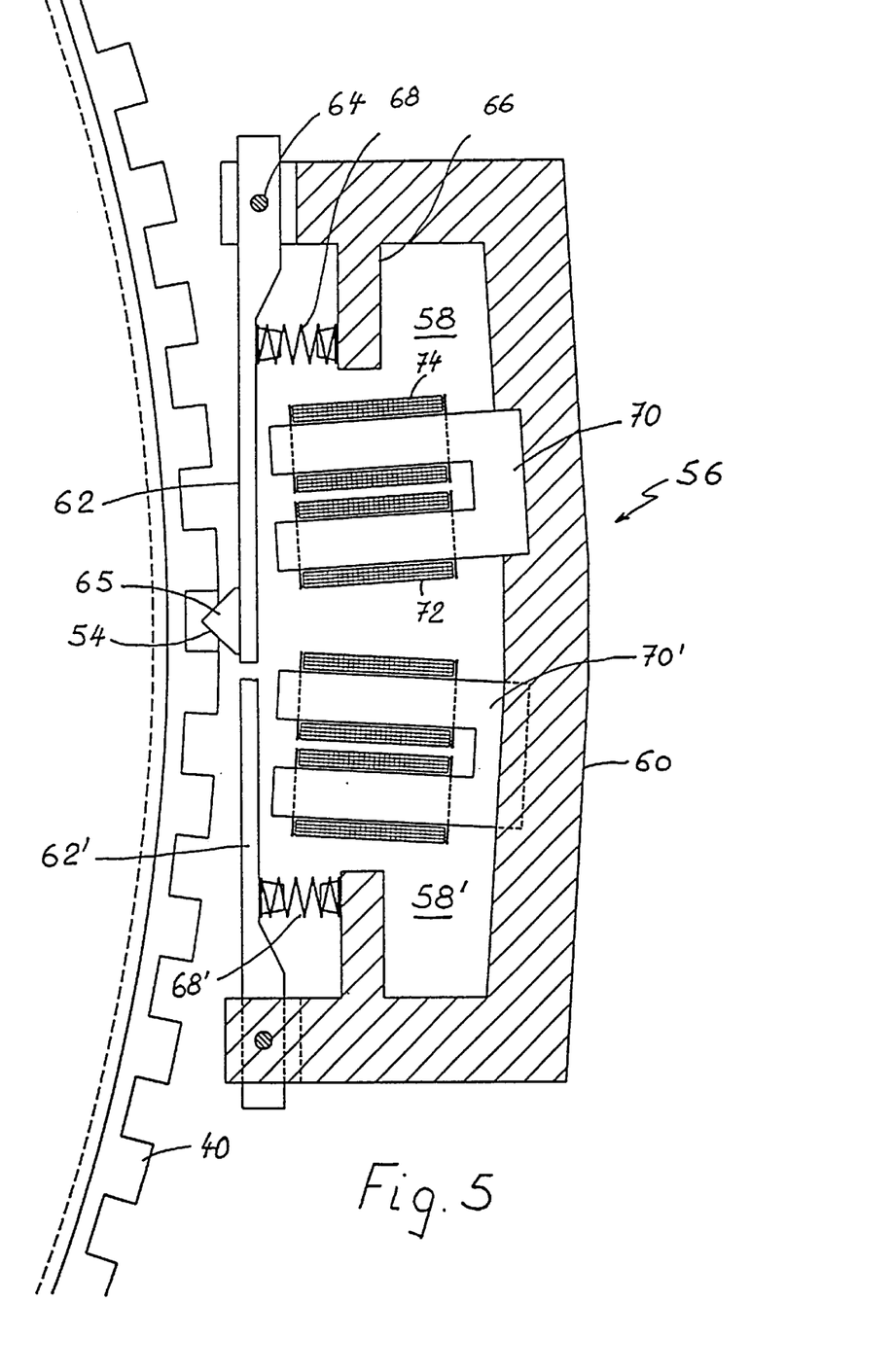
FIG. 5 shows a locking apparatus of the carrier platter.

The locking is performed by a locking apparatus 56, which extends over the entire height of the disc store, is shown in cross-section in FIG. 5 and includes an electromagnetic bolt 58 for each carrier platter 22. The locking apparatus 56 comprises an elongate U-shaped housing 60, open towards the disc store. Each bolt 58 comprises a lever 62, which is pivotally mounted by one end at 64 in a lateral wall of the housing 60 and has at the opposite end an engaging head 65 corresponding to the engaging grooves 54 of the toothed ring 40. The pivotable lever 62 is loaded by a spring 68, supported on a rib 66 of the housing 60. Each pivoting lever 62 is assigned an electromagnet 70, which is fastened on the wall of the housing 60 and the pole shanks of which bear excitation windings 72, 74.

Just as in the case of the driving apparatus of FIG. 4, for reasons of space it is not possible to arrange all the electromagnetic bolts one under the other. The locking apparatus 56 therefore has two rows of bolts 58, 58', the bolts 58 of one row being provided for the even-numbered carrier platters and the bolts 58' being provided for the odd-numbered carrier platters.

The pivoting levers 62, 62' are normally held under the action of their spring 68, 68' in engagement with the toothed ring 40, whereby the carrier platters are locked. Upon excitation of the electromagnets 70, 70', they are unlocked against the spring force and permit the free rotation of the carrier platters. The activation of the electromagnetic bolts 58, 58' is coordinated with the control of the driving apparatus, to be precise in such a way that each time a drive (FIG. 4) of a carrier platter is actuated, the electromagnet 70, 70' of the same platter is at the same time excited and that, when a driving apparatus is switched off, the locking automatically takes place by deactivation of the respective electromagnets 70, 70' under the action of the spring 68, 68'.

Figure 6:
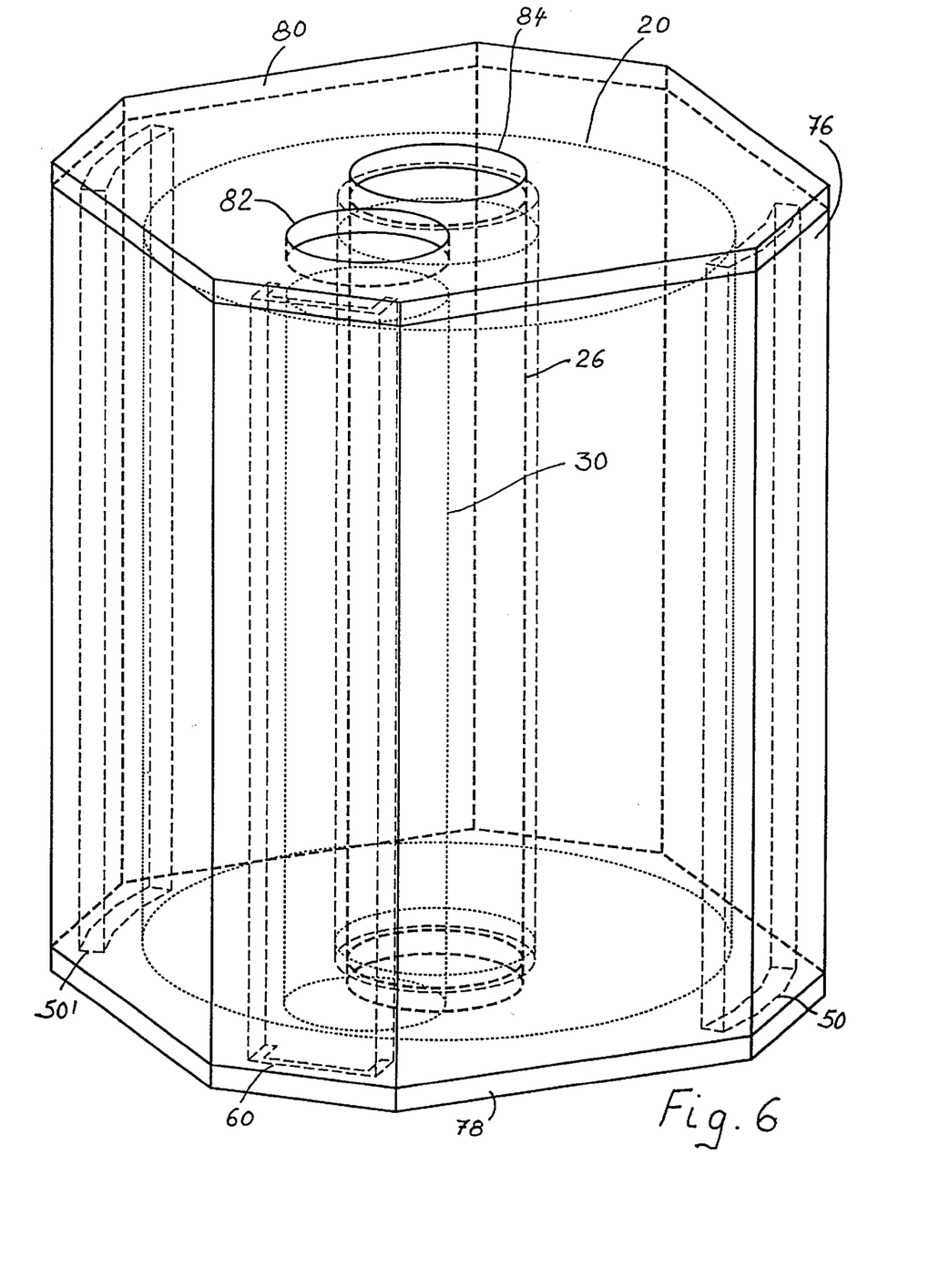
FIG. 6 shows a perspective representation in a view through a storing apparatus.

FIG. 6 diagrammatically shows a storing apparatus in a transparent perspective view. The dotted outline corresponds to the disc store 20 from FIG. 1. This disc store 20 is accommodated in a cylindrical housing with an outer wall 76, a base 78 and a cover 80. The cover 80 is provided with a central opening 84 for securing the column 26 and additionally has a further opening 82 which corresponds to the shaft 30 and permits access to the latter.

50 and 50' indicate the two supporting rails of the driving apparatus, while the housing of the locking apparatus can be seen at 60. The rails 50, 50' and the housing 60 may be screwed to the base 78 and the cover 80.

Figures 7, 8:
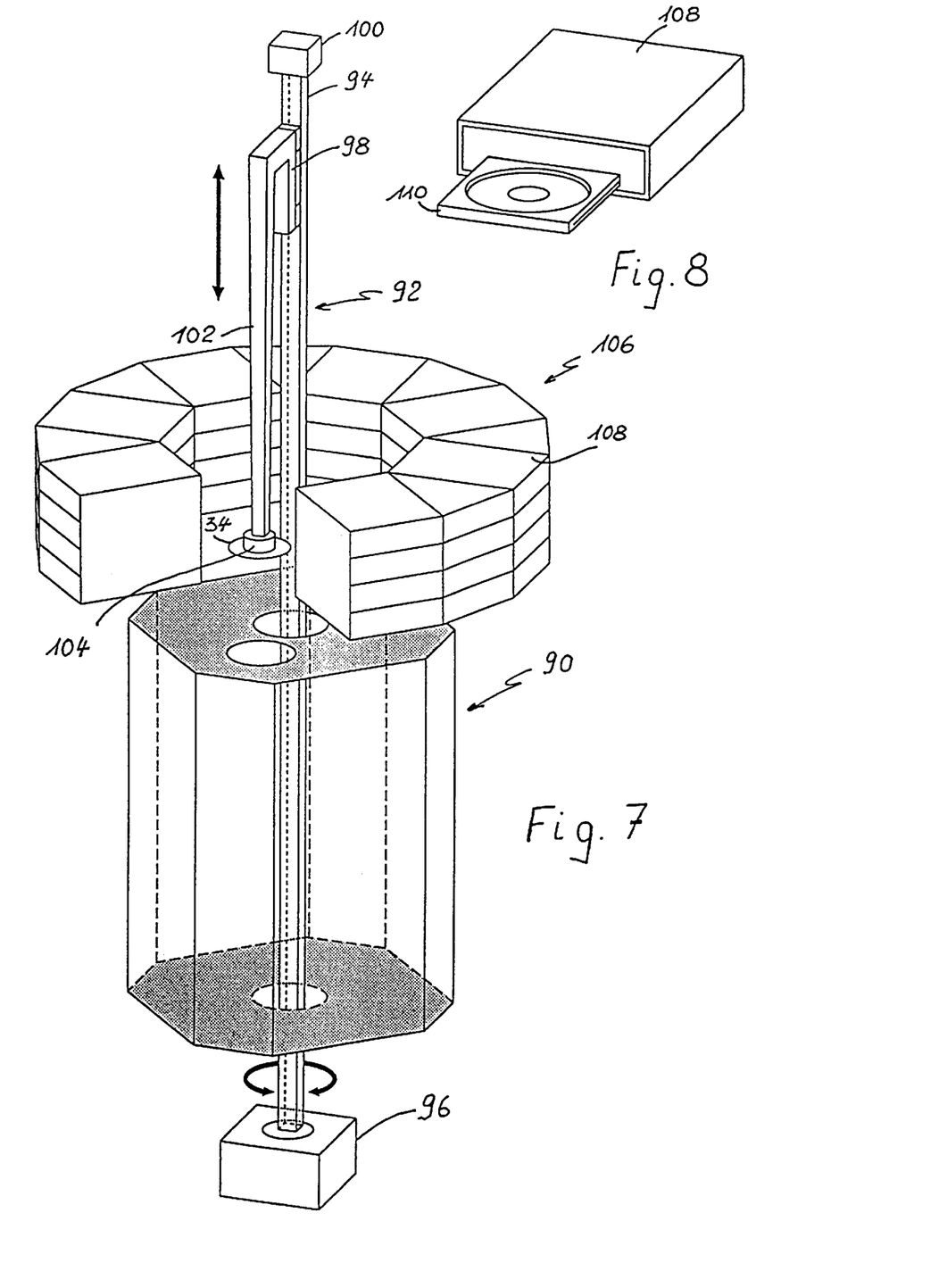
FIG. 7 shows an overall view of a first exemplary embodiment of the apparatus according to the invention.
FIG. 8 shows a diagrammatic view of a single reading device.

In the overall view of FIG. 7 of the first embodiment of the apparatus according to the invention, the storing apparatus shown in FIG. 6 is denoted diagrammatically by 90. 92 indicates a gripping and transferring apparatus. This comprises a vertical rail 94, which extends axially through the supporting column of the disc store in the storing apparatus 90. Underneath the storing apparatus 90, the rail 94 is supported rotatably by a plinth 96 and driven in the direction of the arrow by a suitable drive (not shown), for example a program-controlled stepping motor known per se, and is accordingly rotatable through 360°. Above the storing apparatus there is provided a carriage 98, which is vertically movable along the rail 94 and displaceable in the direction of the arrow by means of a drive, diagrammatically indicated by 100. The drive may take place, for example, in a way which is simple and known per se by a spindle running along the rail. The drive could also take place by an endless toothed belt.

A gripping arm 102 extends downwards from the carriage 98 parallel to the spindle 94 and, with corresponding orientation of the rail, can be moved upwards and downwards through the shaft in the storing apparatus. At the lower end of the gripping arm 102 there is a pneumatically operated suction head 104, which is capable of taking a compact disc with it, as diagrammatically indicated by 34.

Provided above the storing apparatus is a reading and writing station 106 for compact discs. In the example shown, the station 106 comprises individual commercially available, possibly slightly modified reading or writing devices 108 stacked one above the other around the gripping and transferring apparatus 92 in the form of a ring, one of these reading devices being reproduced individually in FIG. 8. In the example shown, the station 106 comprises seven stacks of six reading or writing devices each. Reading-writing station 106 is to be understood as a station which comprises either reading devices or writing devices or both or devices which both read and write.

Instead of suspending the carriage 98 with the gripping arm 102 movably on the rail 94, it would likewise be possible to provide the gripping arm on the tip of a telescopically rotatable mast, which is hydraulically extendable and retractable, in order to move the gripping arm up and down through the shaft.

When the apparatus shown in FIG. 7 is in the position of rest, the gripping arm 102 is in the waiting position shown, above the shaft 30 of the disc store 20 shown in FIG. 1. In this case, the individual carrier platters 22 are likewise in the locked waiting position, so that the shaft 30 is open right through. With telematic operation of the apparatus for reading a selected compact disc, the corresponding carrier platter 22 is unlocked according to FIG. 5 and turned by the drive shown in FIG. 4 until the selected compact disc lies on the axis of the shaft. In this angular position, the carrier platter is locked once again. At the same time, the gripping arm 102 is lowered by the drive 100 into the shaft 30 until the suction head 104 is located over the selected compact disc. Subsequently, the suction head 104 is actuated and the compact disc is lifted out of the shaft 100 by the gripping arm 104. As soon as the suction head 104 with the compact disc leaves the shaft 30, the rail 94 is turned until the gripping arm 102 is located in the angular position corresponding to a free reading or writing device 108. Here, the compact disc is deposited by the suction head 104 into the tray 110 (FIG. 8), moved out in the meantime, of the device 108. As soon as the suction head is freed of the compact disc, the apparatus 92 is brought back automatically into the waiting position shown in FIG. 7, while after automatic closing of the tray the device 108 is ready to start. In the meantime, the carrier platter in the disc store has likewise been turned again into its position of rest. Once the reading or writing operation has been ended, the compact disc is brought back again automatically from the device 108 to its depository zone, corresponding to a reverse sequence.

The individual drives are automatically controlled via a central computing unit, so that the various movement sequences are coordinated with one another.

Figure 9:
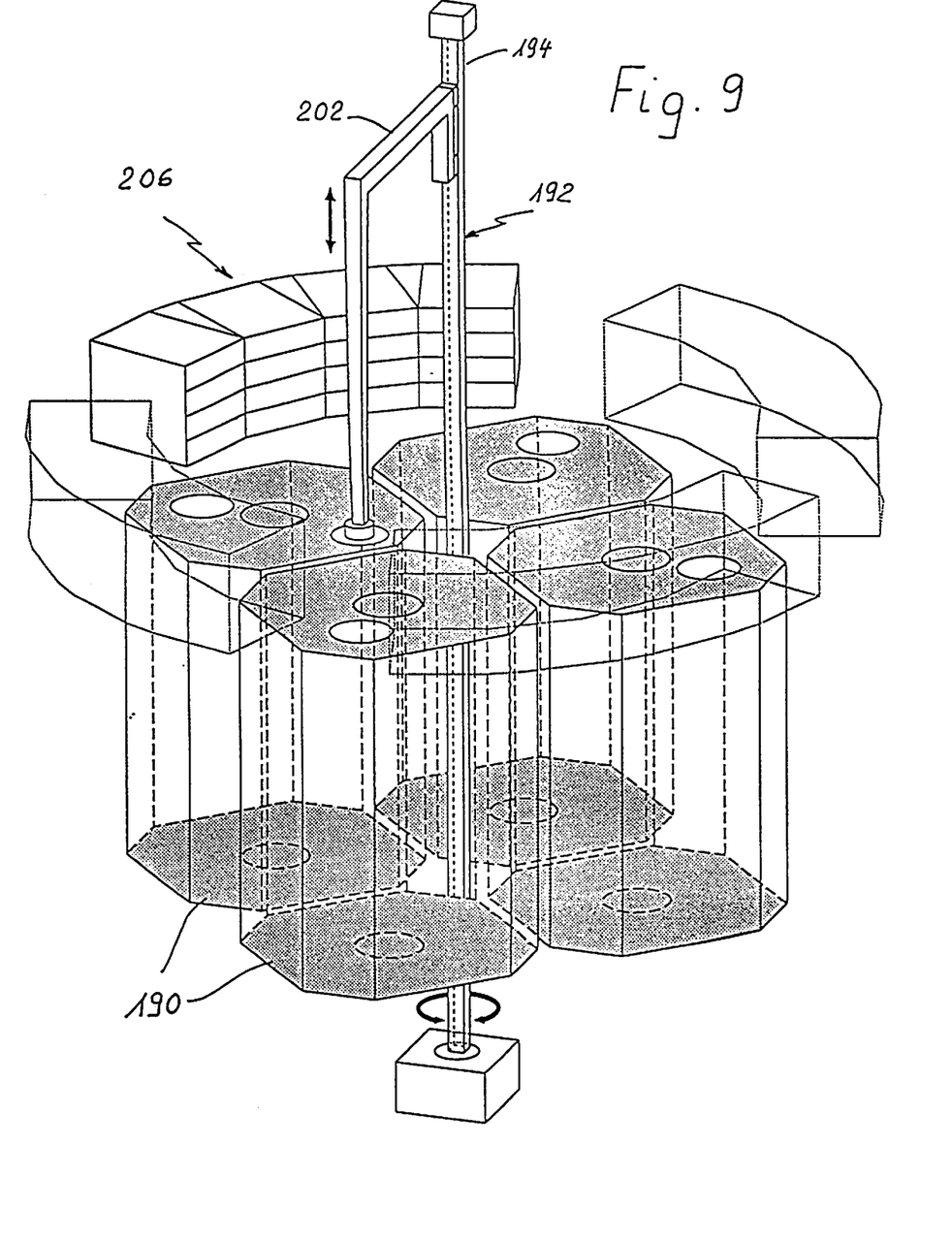
FIG. 9 shows an overall view of a second exemplary embodiment of the apparatus according to the invention, with a larger disc capacity.

FIG. 9 shows a view similar to FIG. 7 of an apparatus according to the invention with a larger storage capacity. In the case of this apparatus, four storing apparatuses 190 according to FIG. 6 are arranged around a common gripping and transferring apparatus 192. In comparison with FIG. 7, the gripping arm 202 has a longer extension arm, since the shafts of the individual storing apparatuses 190 are further away from the rail 192. Otherwise, the gripping and transferring apparatus 192 operates in the same way as the apparatus 92 of FIG. 7.

The reading and writing station 206 is adapted to the capacity of the storing apparatuses 190 and comprises, for example, four units with four stacks of individual devices each.

I claim:

1. Apparatus for storing data carriers (34) with automatic access to the individual data carriers (34), having at least one storing apparatus for keeping the data carriers, a reading-writing station (106, 206) for the data carriers (34) and a gripping and transferring apparatus (92, 192) to transfer each data carrier individually between the storing apparatus and the reading-writing station (106) or vice versa, each storing apparatus comprising a number of carrier platters (22) stacked one above the other and rotatably mounted, which are rotatable individually between a waiting position and access positions by means of a driving apparatus, each carrier platter (22) having a number of depository zones (32) for the data carriers (34) and at least one opening (28), which are arranged on a concentric circular line, the respective openings (28) of the individual carrier platters (22) being arranged such that they form in the waiting position of all the carrier platters (22) a cylindrical shaft (30) extending over an entire height of the storing apparatus, through which shaft the carrier platters (22) are accessible by the gripping and transferring apparatus (92, 192) wherein the individual depository zones (32) of each carrier platter (22) are closed radially towards an outer edge of the carrier platter (22) and wherein each carrier platter (22) is assigned a separate driving apparatus, which interacts with the outer edge of each carrier platter (22) and with which the individual carrier platters (22) are rotatable about a central carrier column (26), and in that the gripping and transferring apparatus (92, 192) has a rotatable vertical rail (94, 194), with a carriage (98) which can be moved up and down along the rail (94, 194) and a gripping arm (102, 202), which extends from the carriage (98) vertically into the shaft (30) of a disc store and with which the data carriers (34) can be individually lifted out through the shaft (30) or deposited in the shaft (30) onto one of the depository zones (32).

2. Apparatus according to claim 1, wherein a pneumatic suction head (104) is provided at the end of the gripping arm (102, 202).

3. Apparatus according to claim 1, wherein the rotatable rail (94) extends axially through the carrier column (26) of a disc store (20).

4. Apparatus according to claim 1, wherein a plurality of storing apparatuses (190) arranged around a common gripping and transferring apparatus (192).

5. Apparatus according to claim 1, wherein each driving apparatus comprises a pseudo-linear stepping motor and in that each carrier platter (22) has an outer toothed ring (40) of magnetic soft iron, which forms a rotor of the stepping motor.

6. Apparatus according to claim 1, wherein each carrier platter (22) has six circular depository zones (32).

7. Apparatus according to claim 1, wherein each depository zone (32) comprises a plate-shaped depression with an open bottom.

8. Apparatus according to claim 1, wherein the individual carrier platters (22) are arranged in groups on the central column (26) by means of spacer rings and snap rings (42, 44).

9. Apparatus according to claim 8, wherein each carrier platter (22) runs between an upper ball ring and a lower ball ring.

10. Apparatus according to claim 9, wherein for each carrier platter (22) the upper ball ring is offset radially with respect to the lower ball ring.

11. Apparatus according to claim 1, further including a locking apparatus (56) in order to lock the carrier platters (22) in the waiting position and in the access positions.

12. Apparatus according to claim 11, wherein the locking apparatus (56) has a number of electromagnets (70, 70') and horizontally pivotable levers (62, 62') corresponding to the number of carrier platters (22) and wherein the pivotable levers (62, 62') are respectively pivotable under the action of a spring (68, 68') in engagement with an outer toothed ring (40) of a carrier platter (22) and, upon excitation of assigned magnet armatures, can be unlocked against the action of their spring.

13. Apparatus according to claim 12, wherein the electromagnets (70, 70') and the pivoting levers (62, 62') are arranged in two rows in a housing (60).

14. Apparatus according to claim 1, wherein each storing apparatus (90, 190) comprises a disc store (20) which is arranged in a cylindrical housing with an outer wall (76) and wherein there are provided between the outer wall (76) and the disc store (20) a locking apparatus (56), extending along the disc store (20), and two drive units (50, 50') with respective drives for the even-numbered and the odd-numbered carrier platters.

* * * * *